United States Patent
Warren et al.

(10) Patent No.: US 9,285,205 B2
(45) Date of Patent: Mar. 15, 2016

(54) TURBOMACHINE PROBE RETENTION FEATURE

(75) Inventors: Eli Cole Warren, Wethersfield, CT (US); William W. Rice, Portland, CT (US)

(73) Assignee: United Technologies Corporation, Hartford, CT (US)

(*) Notice: Subject to any disclaimer, the term of this patent is extended or adjusted under 35 U.S.C. 154(b) by 811 days.

(21) Appl. No.: 13/591,662

(22) Filed: Aug. 22, 2012

(65) Prior Publication Data

US 2014/0056692 A1 Feb. 27, 2014

(51) Int. Cl.
G01B 7/14 (2006.01)

(52) U.S. Cl.
CPC .............. G01B 7/14 (2013.01); *F05D 2260/80* (2013.01); *Y10T 29/49947* (2015.01); *Y10T 29/49968* (2015.01)

(58) Field of Classification Search
CPC ........ F01D 17/02; F05D 2260/80; G01G 7/14
USPC ........................................................ 415/201
See application file for complete search history.

(56) References Cited

U.S. PATENT DOCUMENTS

| | | | | |
|---|---|---|---|---|
| 3,917,432 A * | 11/1975 | Feuerstein | ......... | G02B 23/2476 356/241.6 |
| 4,063,167 A | 12/1977 | Duly | | |
| 4,495,810 A * | 1/1985 | Tessarzik | ............... | G01D 11/30 324/207.24 |
| 4,563,643 A * | 1/1986 | Leschek et al. | .......... | 324/207.16 |
| 4,585,390 A * | 4/1986 | Pirtle | ...................... | F01D 9/042 415/160 |
| 4,817,417 A * | 4/1989 | Twerdochlib | ................... | 73/660 |
| 4,818,948 A | 4/1989 | Dooley | | |
| 5,101,165 A * | 3/1992 | Rickards | ........................ | 324/662 |
| 5,140,494 A * | 8/1992 | Slade | ............................ | 361/212 |
| 5,166,626 A | 11/1992 | Hester et al. | | |
| 5,366,290 A * | 11/1994 | Mayer | ................... | G01J 5/0014 250/338.1 |
| 6,445,177 B1 * | 9/2002 | Higgins | ....................... | 340/631 |
| 6,717,418 B2 | 4/2004 | Orenstein | | |
| 6,773,678 B2 | 8/2004 | Cummings et al. | | |
| 6,819,122 B2 | 11/2004 | Slates | | |
| 6,848,193 B1 * | 2/2005 | Kirzhner | ......................... | 33/833 |
| 7,458,768 B2 * | 12/2008 | Dube et al. | .................... | 415/115 |

* cited by examiner

*Primary Examiner* — Craig Kim
*Assistant Examiner* — Kayla McCaffrey
(74) *Attorney, Agent, or Firm* — Carlson, Gaskey & Olds, P.C.

(57) ABSTRACT

An example turbomachine probe assembly includes a probe body extending along a probe axis from a first sensor end to an opposing second end. An eccentric retention feature is configured to engage the probe body into contact with wall having an aperture that receives the probe body. The eccentric retention feature limits movement of the probe body along the probe axis relative to the wall.

19 Claims, 6 Drawing Sheets

TURBOMACHINE PROBE RETENTION FEATURE

BACKGROUND

This disclosure relates generally to retaining a probe and, more particularly, to a secondary retention feature for retaining a turbomachine probe Turbomachines, such as gas turbine engines, typically include a fan section, a compression section, a combustion section, and a turbine section. Turbomachines may employ a geared architecture connecting portions of the compression section to the fan section.

The turbomachine includes annular case structures that, for example, circumscribe rotatable arrays of blades. The turbomachine may include probes mounted to the case structures. The probes in some examples, may monitor a distance between tips of the blades and the associated case structure. Probes can be welded to the case structures. If the welds fail, the probes may fall into a gas path of the turbomachine, which can cause damage.

SUMMARY

A turbomachine probe assembly according to an exemplary aspect of the present disclosure includes, among other things, a probe body extending along a probe axis from a first sensor end to an opposing, second end. An eccentric retention feature is configured to engage the probe body and to contact a wall having an aperture that receives the probe body. The eccentric retention future limits movement of the probe body along the probe axis relative to the wall.

In a further nonlimiting embodiment of the foregoing turbomachine probe assembly, the first sensor comprises a lip, and the wall is held between the lip and the eccentric retention feature.

In a further nonlimiting embodiment of either of the foregoing turbomachine probe assemblies, the eccentric retention feature comprises a post that is received within an aperture provided by the probe body. The post extends to an eccentric lobe of the eccentric retention feature.

In a further nonlimiting embodiment of any of the foregoing turbomachine probe assemblies, the probe body is welded to the wall.

In a further nonlimiting embodiment of any of the foregoing turbomachine probe assemblies, the wall is an annular wall, and the eccentric retention feature is configured to contact an outwardly facing surface of the annular wall.

In a further nonlimiting embodiment of any of the foregoing turbomachine probe assemblies, the eccentric retention feature includes apertures configured to receive a post that rotates the eccentric retention feature.

In a further nonlimiting embodiment of any of the foregoing turbomachine probe assemblies, the eccentric retention feature is welded to the probe body when the probe body is in an installed position.

In a further nonlimiting embodiment of any of the foregoing turbomachine probe assemblies, the eccentric retention feature includes an eccentric lobe that directly contacts the wall when the probe body is in an installed position.

In a further nonlimiting embodiment of any of the foregoing turbomachine probe assemblies, the wall is within a compressor section of a turbomachine.

In a further nonlimiting embodiment of any of the foregoing turbomachine probe assemblies, the probe is a capacitance probe.

In a further nonlimiting embodiment of any of the foregoing turbomachine probe assemblies, the probe is configured to determine a distance between a sensor end of the probe and a tip of a turbomachine blade.

A turbomachine compressor case assembly according to an exemplary aspect of the present disclosure includes, among other things, an annular compressor case disposed about a rotational axis A of a turbomachine. A plurality of probe assemblies each have a main body portion, a lip portion, and at least one eccentric retention feature. The main body portion is received within a respective aperture of the annular compressor case. The eccentric retention feature engages the main body portion such that a portion of the annular compressor case is positioned radially between the eccentric retention feature and the lip portion to limit radial movement of the probe.

In a further nonlimiting embodiment of the foregoing turbomachine compressor case assembly, the plurality of probe assemblies each house capacitance sensors configured to monitor variations in a radial distance between the plurality of probe assemblies and a tip of a compressor blade.

In a further nonlimiting embodiment of either of the foregoing turbomachine compressor case assemblies, the plurality of probe assemblies are welded to the annular compressor case.

In a further nonlimiting embodiment of any of the foregoing turbomachine compressor case assemblies, the at least one eccentric retention feature is welded to the main body portion of the respective one of the plurality of probe assemblies.

In a further nonlimiting embodiment of any of the foregoing turbomachine compressor case assemblies, each of the plurality of probe assemblies includes two eccentric retention features.

A method of retaining a probe within a turbomachine according to another exemplary aspect of the present disclosure includes, among other things, inserting a probe body within an aperture of a turbomachine case, and capturing a portion of the turbomachine case between a lip of the probe body and an eccentric retention feature engaging the probe body.

In a further nonlimiting embodiment of the foregoing method of retaining a probe, the method includes welding the probe body to the turbomachine case.

In a further nonlimiting embodiment of either of the foregoing methods of retaining a probe body, the capturing comprises rotating the eccentric retention feature to a position where an eccentric lobe of the eccentric retention feature contacts the turbomachine case.

In a further nonlimiting embodiment of any of the foregoing methods of retaining a probe body, the method includes welding the eccentric retention feature to the probe body after the capturing.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
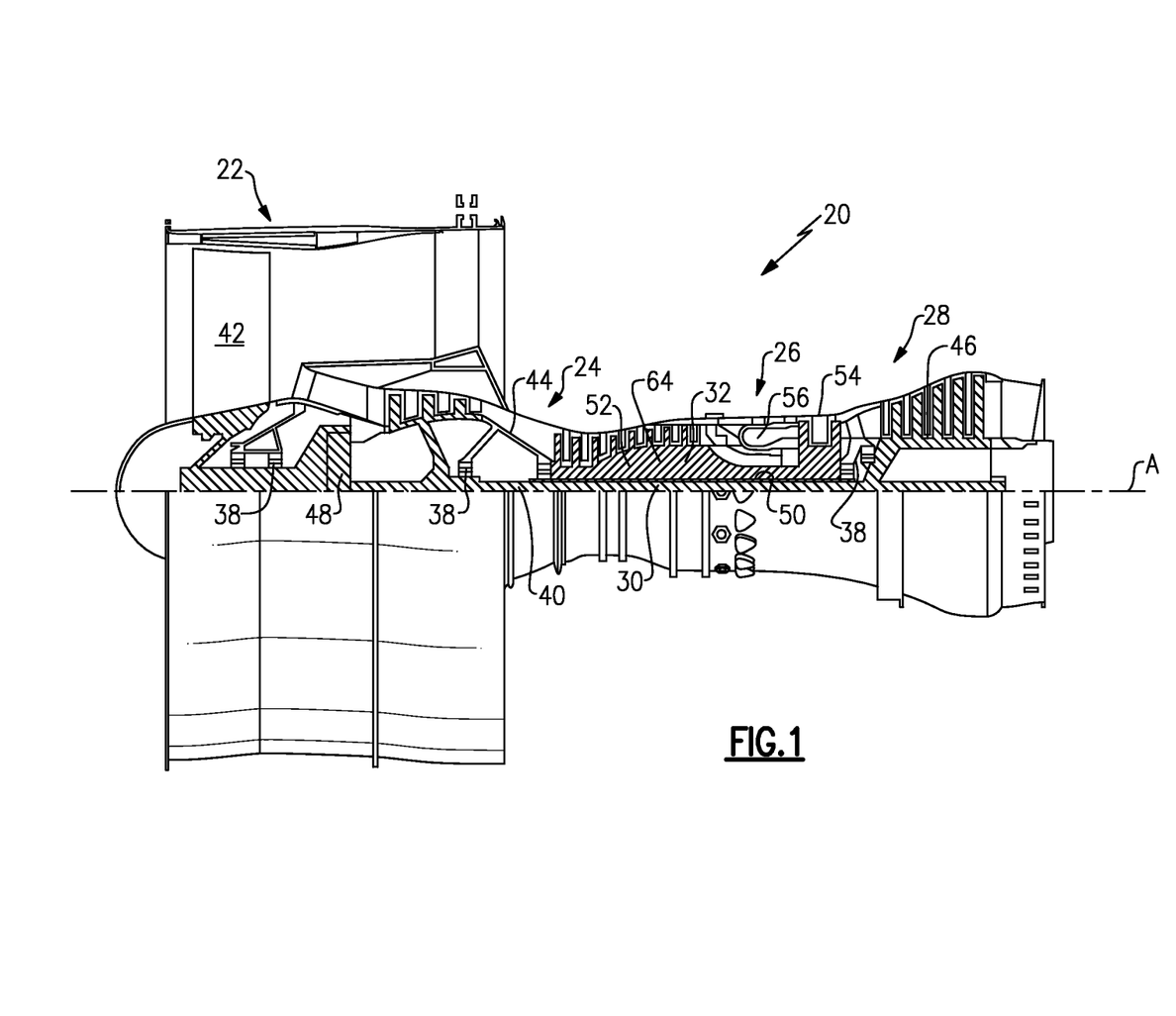
FIG. 1 shows an example turbomachine.

FIG. 1 schematically illustrates an example turbomachine, which is a gas turbine engine 20 in this example. The gas turbine engine 20 is a two-spool turbofan gas turbine engine that generally includes a fan section 22, a compression section 24, a combustion section 26, and a turbine section 28.

Although depicted as a two-spool turbofan gas turbine engine in the disclosed non-limiting embodiment, it should be understood that the concepts described herein are not limited to use with turbofans. That is, the teachings may be applied to other types of turbomachines and turbine engines including three-spool architectures. Further, the concepts described herein could be used in environments other than a turbomachine environment and in applications other than aerospace applications.

In the example engine 20, flow moves from the fan section 22 to a bypass flowpath. Flow from the bypass flowpath generates forward thrust. The compression section 24 drives air along the core flowpath. Compressed air from the compression section 24 communicates through the combustion section 26. The products of combustion expand through the turbine section 28.

The example engine 20 generally includes a low-speed spool 30 and a high-speed spool 32 mounted for rotation about an engine central axis A. The low-speed spool 30 and the high-speed spool 32 are rotatably supported by several bearing systems 38. It should be understood that various bearing systems 38 at various locations may alternatively, or additionally, be provided.

The low-speed spool 30 generally includes a shaft 40 that interconnects a fan 42, a low-pressure compressor 44, and a low-pressure turbine 46. The shaft 40 is connected to the fan 42 through a geared architecture 48 to drive the fan 42 at a lower speed than the low-speed spool 30.

The high-speed spool 32 includes a shaft 50 that interconnects a high-pressure compressor 52 and high-pressure turbine 54.

The shaft 40 and the shaft 50 are concentric and rotate via bearing systems 38 about the engine central longitudinal axis A, which is collinear with the longitudinal axes of the shaft 40 and the shaft 50.

The combustion section 26 includes a circumferentially distributed array of combustors 56 generally arranged axially between the high-pressure compressor 52 and the high-pressure turbine 54.

In some non-limiting examples, the engine 20 is a high-bypass geared aircraft engine. In a further example, the engine 20 bypass ratio is greater than about six (6 to 1).

The geared architecture 48 of the example engine 20 includes an epicyclic gear train, such as a planetary gear system or other gear system. The example epicyclic gear train has a gear reduction ratio of greater than about 2.3 (2.3 to 1).

The low-pressure turbine 46 pressure ratio is pressure measured prior to inlet of low-pressure turbine 46 as related to the pressure at the outlet of the low-pressure turbine 46 prior to an exhaust nozzle of the engine 20. In one non-limiting embodiment, the bypass ratio of the engine 20 is greater than about ten (10 to 1), the fan diameter is significantly larger than that of the low pressure compressor 44, and the low-pressure turbine 46 has a pressure ratio that is greater than about 5 (5 to 1). The geared architecture 48 of this embodiment is an epicyclic gear train with a gear reduction ratio of greater than about 2.5 (2.5 to 1). It should be understood, however, that the above parameters are only exemplary of one embodiment of a geared architecture engine and that the present disclosure is applicable to other gas turbine engines including direct drive turbofans.

In this embodiment of the example engine 20, a significant amount of thrust is provided by the bypass flow B due to the high bypass ratio. The fan section 22 of the engine 20 is designed for a particular flight condition—typically cruise at about 0.8 Mach and about 35,000 feet. This flight condition, with the engine 20 at its best fuel consumption, is also known as "Bucket Cruise" Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example engine 20 is less than 1.45 (1.45 to 1).

Low Corrected Fan Tip Speed is the actual fan tip speed divided by an industry standard temperature correction of Temperature divided by 518.7 ^0.5. The Temperature represents the ambient temperature in degrees Rankine. The Low Corrected Fan Tip Speed according to one non-limiting embodiment of the example engine 20 is less than about 1150 fps (351 m/s).

Referring now to FIGS. 2 to 6 with continuing reference to FIG. 1, an example case is a compressor case 60 from the high-pressure compressor section 52 of the engine 20 circumscribes a compressor blade array 64. For clarity, the compressor blade array 64 is shown in broken line form in FIG. 2.

Figure 2:
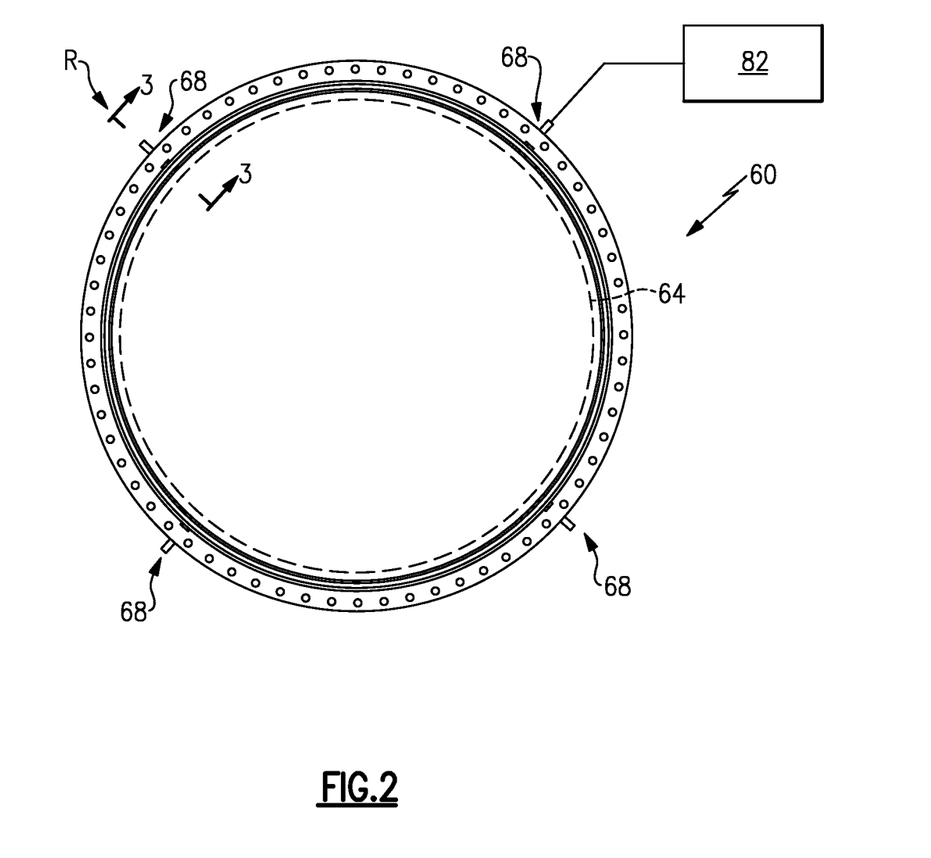
FIG. 2 shows and aft view of a compressor case of the FIG. 1 turbomachine.
Figure 3:
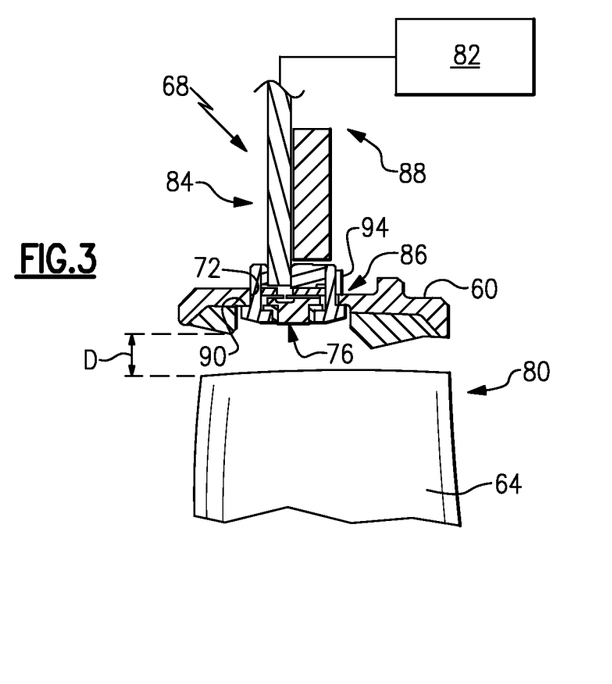
FIG. 3 shows a section view at line 3-3 in FIG. 2.
Figure 4:
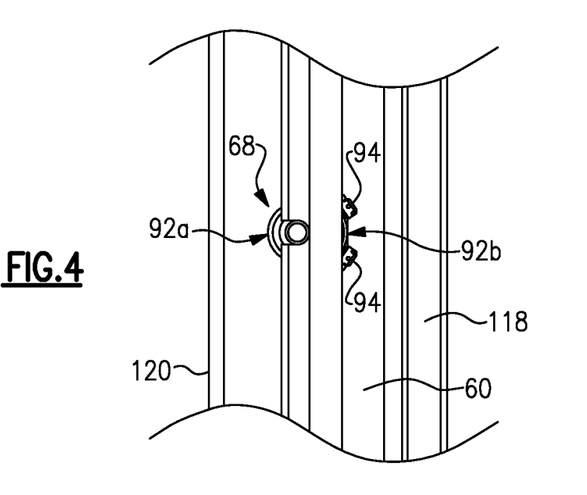
FIG. 4 shows a view at direction R in FIG. 2.

The compressor case holds multiple probe assemblies 68 within respective apertures 72 of the compressor case 60. The probe assemblies 68 include sensors 76 that monitor a distance D between tips 80 of blades within the array 64 and the sensor 76. The distance D is monitored during operation of the engine 20. Identifying changes in the distance is useful as is known. Identifying changes in the distance D may identify areas having unacceptable wear and/or performance. The sensors 76 are capacitance sensors in this example.

The sensors 76 may be linked to a controller 82 that calculates the distance D based on the measured capacitance.

Each of the probe assemblies 68 includes a probe body 84 extending from a first sensor end 86 to an opposing second end 88. The first sensor end 86 includes a sensor face 76 and a lip 90. The second end 88 is connected to the controller 82.

When installing the probe assemblies 68 to the case 60, the probe assemblies 68 are inserted through the aperture 72, moving in a radially outboard direction, until the lip 90 contacts the case 60. The case 60 is an example wall of the engine 20. A fixture (not shown) may be used to hold the probe assembly 68 in a position where the lip contacts the case 60. A spot weld 92a and 92b are then applied to hold the probe assembly 68 within the aperture 72. In this example, the spot welds 92a and 92b, are considered a primary retention feature associated with the probe assembly 68.

Figure 5:
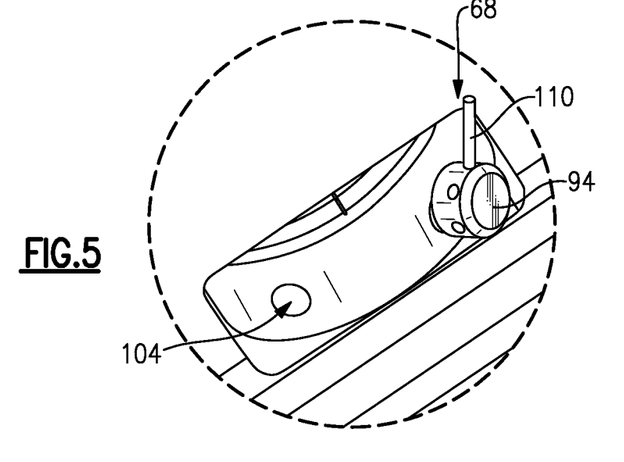
FIG. 5 shows a perspective view of a probe area of the FIG. 2 compressor case with one eccentric retention feature partially installed.
Figure 7:
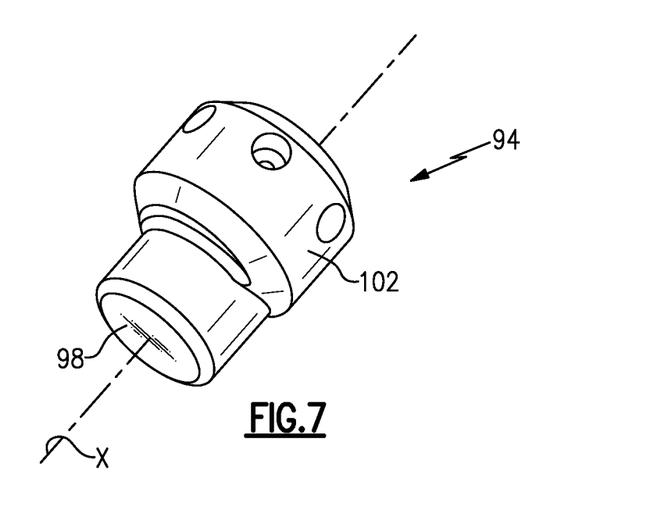
FIG. 7 shows a perspective view of the eccentric retention feature.
Figure 8:
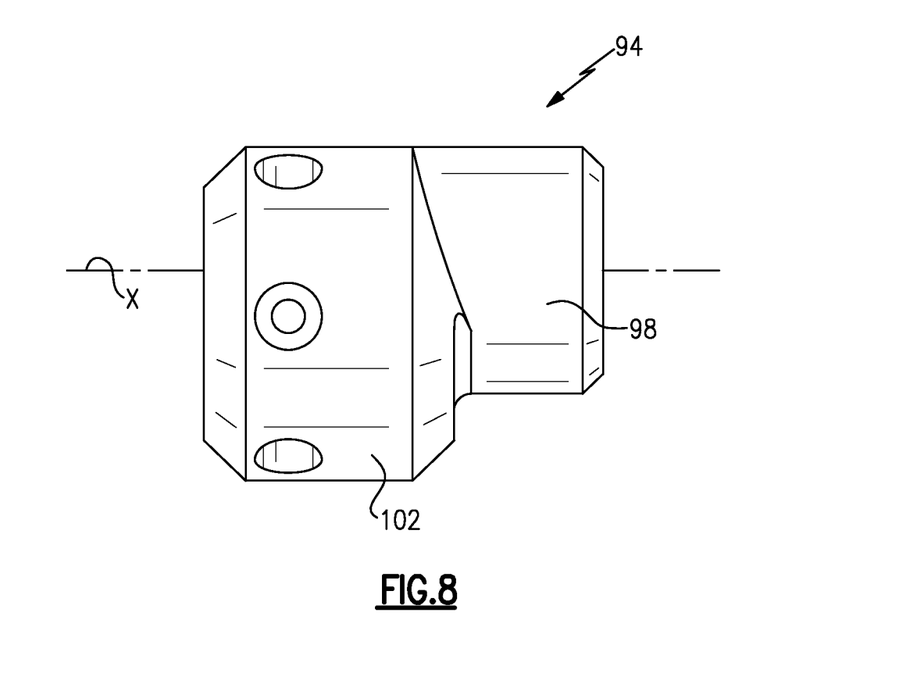
FIG. 8 shows a side view of the eccentric retention feature of FIG. 7.

After securing the probe assembly 68 via the welds 92a and 92b, at least one secondary retention feature 94 is added to the probe assembly 68. The secondary example retention feature 94 is an eccentric retention feature and includes a post 98 extending along an axis X from an eccentric lobe 102.

The secondary retention feature 94 is installed within the probe assembly 68 by inserting the post 98 into an aperture 104 of the probe body. A tool 110 is then inserted into one of a plurality of apertures 114 within the eccentric lobe 102. The tool 110 is used to rotate the secondary retention feature 94 about an axis X of the post 98 from the partially installed position shown in FIG. 5 to the fully installed position of FIG. 6. In the fully installed position, the eccentric lobe 102 contacts an outwardly facing surface of the case 60.

Figure 6:
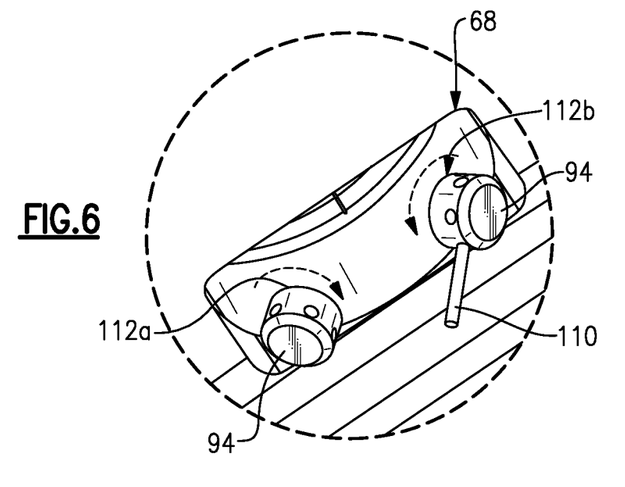
FIG. 6 shows the view of FIG. 5 with the eccentric retention features rotated to an installed position.

The eccentric lobe 102 allows the secondary retention feature 94 to accommodate variations due to tolerance stacks, etc. For example, if the radial distance between the aperture 104 and the case 60 is relatively large, the secondary retention feature 94 is rotated further about the axis X until the eccentric lobe 102 contacts the case 60.

To complete installation of the secondary retention feature 94, spot welds 112a and 112b are applied when the eccentric lobe 102 contacts the case 60. Welding the secondary retention feature 94 holds the rotational position of the secondary retention feature 94. In this rotational position, contact between the secondary retention feature 94 and the case 62 prevent the probe assembly 68 for moving radially inward (in the direction R) through the aperture 72 should the spot welds 92a and 92b fail.

In the example probe assembly 68, two of the secondary retention features 94 are used. Both of which are located in an aft portion of the probe assembly 68 relative to a direction of flow through the engine 20. The example case 60 has a wall 118 extending aft to contact another axially adjacent case. A leading edge 120 of the example case 60 lacks such a wall and is open to a gas flow path through the engine 20 (due to, for example, a bleed cavity). Positioning the secondary retention features 94 in the aft portion ensures that, should be secondary retention features 94 become disengaged from the probe body 84, movement of the secondary retention features 94 into the gas flow path is blocked by at least the wall 118. The secondary retention features 94 may be placed in the leading portion in another example.

Figure 9:
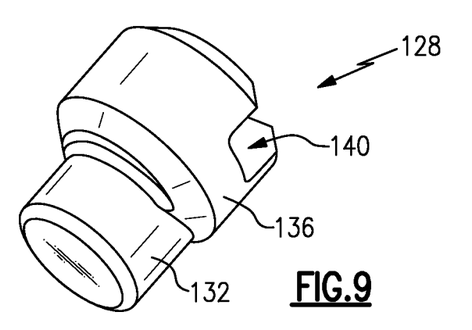
FIG. 9 shows a perspective view of another example eccentric retention feature.
Figure 10:
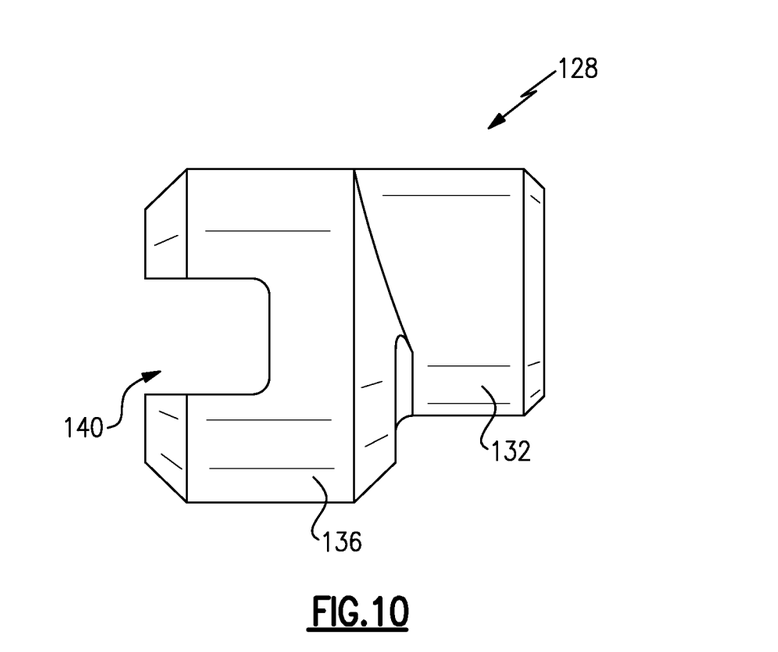
FIG. 10 shows a side view of the eccentric retention feature of FIG. 9.

Referring to FIGS. 9 and 10, another example secondary retention feature 128 includes a post 132 and an eccentric lobe 136. The eccentric lobe 136 of the secondary retention feature 128 includes a slot 140, which is used in place of the apertures 114 and tool 110. The slot 140 receives a bladed tool, such as a screwdriver, to rotate the secondary retention feature 128 about an axis X, between a position where the eccentric lobe 136 is spaced from the case 60 and the fully installed position where the eccentric lobe 136 contacts the case 60.

In some examples, the secondary retention feature 128 is used in areas of the engine 20 where the "end" of the secondary retention feature 128 is more accessible than the side. The secondary retention feature 94 is used in areas of the engine 20 where the "side" of the secondary retention feature 94 is more accessible than the end.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A turbomachine probe assembly, comprising:
a probe body extending along a probe axis from a first sensor end to an opposing second end; and
an eccentric retention feature including a post extending along a retention feature axis from an eccentric lobe that is offset from the post, the eccentric retention feature configured to engage the probe body and to contact a wall having an aperture that receives the probe body, wherein the eccentric retention feature is rotatable against the wall about a retention feature axis to limit movement of the probe body along the probe axis relative to the wall, the probe axis transverse to the retention feature axis.

2. The turbomachine probe assembly of claim 1, wherein the first sensor end comprises a lip, and the wall is held between the lip and the eccentric retention feature.

3. The turbomachine probe assembly of claim 1, wherein the probe body is welded to the wall.

4. The turbomachine probe assembly of claim 1, wherein the wall is an annular wall, and the eccentric retention feature is configured to contact an outwardly facing surface of the annular wall.

5. The turbomachine probe assembly of claim 1, wherein the eccentric retention feature includes apertures configured to receive a tool that rotates the eccentric retention feature.

6. The turbomachine probe assembly of claim 1, wherein the eccentric retention feature is welded to the probe body when the probe body is in an installed position.

7. The turbomachine probe assembly of claim 1, wherein the eccentric lobe directly contacts the wall when the probe body is in an installed position.

8. The turbomachine probe assembly of claim 1, wherein the wall is within a compressor section case of a turbomachine.

9. The turbomachine probe assembly of claim 1, wherein the probe is a capacitance-based clearance probe.

10. The turbomachine probe assembly of claim 9, wherein the probe is configured to determine a distance between the sensor end of the probe and a tip of a turbomachine blade.

11. A turbomachine compressor case assembly, comprising:
an annular compressor case provided about a rotational axis of a turbomachine; and
a plurality of probe assemblies each having
a main body portion,
a lip portion,
at least one eccentric retention feature including a post extending along a retention feature axis from an eccentric lobe that is offset from the post, wherein the main body portion is received within a respective aperture of the annular compressor case, and the at least one eccentric retention feature engages the main body portion such that a portion of the annular compressor case is positioned radially between the eccentric retention feature and the lip portion, the eccentric retention feature being rotatable against the annular compressor case about a retention feature axis to limit radial movement of the probe in a radial direction, the retention feature axis transverse to the radial direction.

12. The turbomachine compressor case assembly of claim 11, wherein the plurality of probe assemblies each house capacitance sensors configured to monitor variations in a radial distance between the plurality of probe assemblies and the tips of compressor blades.

13. The turbomachine compressor case assembly of claim 11, wherein the plurality of probe assemblies are welded to the annular compressor case.

14. The turbomachine compressor case assembly of claim 11, wherein the at least one eccentric retention feature is welded to the main body portion of the respective one of the plurality of probe assemblies.

15. The turbomachine compressor case assembly of claim 11, wherein each of the plurality of probe assemblies includes two eccentric retention features.

16. A method of retaining a probe within a turbomachine, comprising:
   inserting a probe body within an aperture of a turbomachine case;
   capturing a portion of the turbomachine case between a lip of the probe body and an eccentric retention feature engaging the probe body; and
   rotating the eccentric retention feature against the turbomachine case about a retention feature axis to hold the probe body relative to the turbomachine case along a longitudinal axis of the probe body, wherein the eccentric retention feature includes a post extending along the retention feature axis from an eccentric lobe that is offset from the post, wherein the retention feature axis is transverse to the longitudinal axis of the probe body.

17. The method of claim 16, including welding the probe body to the turbomachine case.

18. The method of claim 16, wherein the capturing comprises rotating the eccentric retention feature to a position where the eccentric lobe of the eccentric retention feature contacts the turbomachine case.

19. The method of claim 18, including welding the eccentric retention feature to the probe body after the capturing.

* * * * *